US012393215B2

(12) United States Patent
Singh

(10) Patent No.: US 12,393,215 B2
(45) Date of Patent: Aug. 19, 2025

(54) VOLTAGE REFERENCE GENERATOR AND TRIMMING SYSTEM

(71) Applicant: VERVESEMI MICROELECTRONICS PRIVATE LIMITED, Greater Noida (IN)

(72) Inventor: Pratap Narayan Singh, Greater Noida (IN)

(73) Assignee: VERVESEMI MICROELECTRONICS PRIVATE LIMITED, Greater Noida (IN)

( * ) Notice: Subject to any disclaimer, the term of this patent is extended or adjusted under 35 U.S.C. 154(b) by 183 days.

(21) Appl. No.: 18/128,177

(22) Filed: Mar. 29, 2023

(65) Prior Publication Data

US 2023/0324940 A1 Oct. 12, 2023

(30) Foreign Application Priority Data

Apr. 6, 2022 (IN) ............................. 202211020709

(51) Int. Cl.
*G05F 3/26* (2006.01)
*G05F 1/567* (2006.01)
*G05F 1/575* (2006.01)

(52) U.S. Cl.
CPC .............. *G05F 1/575* (2013.01); *G05F 1/567* (2013.01); *G05F 3/262* (2013.01)

(58) Field of Classification Search
None
See application file for complete search history.

(56) References Cited

U.S. PATENT DOCUMENTS

| | | | | |
|---|---|---|---|---|
| 7,342,390 | B2 * | 3/2008 | Tachibana | G05F 3/30 323/316 |
| 8,044,677 | B2 | 10/2011 | Cremonesi et al. | |
| 8,638,084 | B1 * | 1/2014 | Abugharbieh | G05F 3/30 438/11 |
| 8,643,174 | B2 | 2/2014 | Saether et al. | |
| 9,329,614 | B1 | 5/2016 | Drakshapalli et al. | |
| 9,607,906 | B2 | 3/2017 | Pontarollo et al. | |
| 9,651,981 | B2 | 5/2017 | Lingholm et al. | |
| 10,295,416 | B2 | 5/2019 | Singh et al. | |
| 10,605,676 | B2 | 3/2020 | Yousefzadeh et al. | |
| 2006/0043957 | A1 | 3/2006 | Caravlho et al. | |

* cited by examiner

*Primary Examiner* — Jeffrey S Zweizig
(74) *Attorney, Agent, or Firm* — Maschoff Brennan

(57) ABSTRACT

Embodiments of the present disclosure may relate to a voltage reference generator comprising: a local heater structured to generate continuous controlled temperature and uniform thermal profile, at multiple points further comprising a Bipolar Junction, Transistors, and a heating element. Embodiments may additionally include temperature compensated resistances adopted to generate constant temperature compensated voltage reference current using an operational amplifier, a transistor, and two or more resistors, positive and negative. The embodiments may further include, current mirrors comprising a plurality of MOS transistors configured to mirror current flowing in the PMOS transistor. Further embodiments may include, digital modulators structured to generate modulated control signals, the control signals being structured to control a temperature by trimming change in the voltage reference, and a Digital to Analog Converter configured to generate output current proportional to a current reference mirrored in one or more of the plurality of transistors.

8 Claims, 6 Drawing Sheets

VOLTAGE REFERENCE GENERATOR AND TRIMMING SYSTEM

FIELD OF INVENTION

Present invention relates to the field of temperature insensitive reference voltage generation circuit in particularly curvature compensated reference voltage generator using resistance trimming based on controlled heating of the bipolar transistors.

BACKGROUND OF INVENTION

Precision voltage reference is a critical requirement for design of the linear regulators, ADCs, DACs, Comparators and it is used for defining known voltage which is to be used as reference. In the process of the designing and fabricating the electronic devices there are multiple steps where there is variability involved in changing the device parameters. These device parameters also affect the temperature coefficient of the resulting circuits. This temperature coefficient is the main cause of the drift of the voltage or current being generated. Since this voltage or current drift has variability component associated, it is not possible to pre-determine the trend of the change in the generated voltage and currents. Because of this reason each manufactured device needs to be calibrated to reduce the temperature drift during manufacturing process. Most common technique is to heat the wafer at different temperature and trim the components to get the desired accuracy of the generated reference voltages or currents. This kind of heating and calibration is time consuming process because of heating time constant of the silicon wafers or devices. But heating time constant is larger for the structures with larger size and it is proportion to the size of the structure under heating. When more time is consumed during the manufacturing process it is also increasing the production time, hence cost of the devices being produced. If the temperature dependence calibration required is multiple point, then this time is proportions and it becomes almost not practical. Sometimes silicon wafer testers also lack the features related to heating and it also generates the need of specialized equipment. Another common practice is to perform the on-chip heating of the circuit elements [1-8] and this reduces the overall size of the structure under heating and hence it provides the gain in reducing the time constant of the heating. It is effective way to reduce the production time and need of specialised equipment. But on-chip heating elements involve unknown die temperature and non-uniform thermal profile as described in [6]. Sometimes it is also resulting in permanent damage of the die components if excessive heating happens because of change in the die conductivity. This means controlled heating is a mandatory requirement for reliable calibration of the reference generation circuits. This kind of controlled heating is also useful when multiple temperature points are needed. As described in [3] multiple heaters can be activated to achieve the step thermal response but again it is not continuous temperature points and hence some critical voltage peaks can be missed while calibrating. There is also a need of the continuous controlled temperature to address each temperature dependence points across the transfer function. As curvature compensated reference voltage has multiple higher order peaks in temperature transfer function, there is a requirement of continuous controlled transfer function while performing the trimming of the reference generation devices.

REFERENCES

1. "Resistance Trimming in Bandgap Reference Voltage Sources", Carvalho et al, US Patent 2006/0043957 A1, 2006
2. "Electrical System, Voltage Reference Generation Circuit, and Calibration Method of the Circuit", Cremonesi et al, U.S. Pat. No. 8,044,677 B2, 2011
3. "Integrated Chip with Heating Element and Reference Circuit", Lindholm et al, U.S. Pat. No. 9,651,981 B2, 2017
4. "Calibration Of Temperature Sensitive Circuits with Heater Elements", Saether et al, U.S. Pat. No. 8,643,174 B2, 2014
5. "Bandgap with thermal drift correction", Drakshapalli et al, U.S. Pat. No. 9,329,614, 2016
6. "Heater-assisted voltage calibration of digital temperature sensors", Yousefzadeh et al, U.S. patent Ser. No. 10/605,676, 2020
7. "Temperature sensing circuit with temperature coefficient estimation and compensation using time variable substrate heating", Singh et al, U.S. patent Ser. No. 10/295,416, 2019
8. "Integrated circuit chip with corrected temperature drift", Pontarollo et al, U.S. Pat. No. 9,607,906, 2017

OBJECTIVE OF THE INVENTION

Principal object of this invention is to perform trimming of the precision curvature compensated reference voltage using controlled heating with continuous temperature points which result in substantially constant reference voltage over the pre-defined range of temperatures.

SUMMARY OF THE INVENTION

The invention provides a voltage reference generator comprises:

(a) local heater structured to generate continuous controlled temperature and uniform thermal profile, at multiple points further consists of Bipolar Junction Transistors (Q1, Q2, Q3), and heating element MN1, (b) temperature compensated resistances adopted to generate constant temperature compensated voltage reference (VREF) current using operational amplifier (OP2), transistor PMOS M4, and two or more resistors, positive (RP) and negative (RN), (c) current mirrors consisting of plurality of MOS transistors M2, M3, M4, configured to mirror current flowing in M4 in MOS M2 and M3, (d) digital modulators structured to generate modulated control signals, (e) control signals CTRL1, CTRL2, CTRL3, and CTRL4 are modulated digital bits being structured to control the temperature generated from the local heater in conjunction with variable resistances, by trimming change in VREF, (f) Digital to Analog Converter (DAC) is configured to generate output current proportional to IREF mirrored in M3.

According to one of the embodiments, one the voltage reference generator MOS MN1 is generating heat by thermal effect from ohmic loss of current flowing through the drain to source terminals of MOS MN1, According to other embodiment, the digital modulators are pulse width modulator (PWM) and/or pulse density modulators (PDM).

According to another embodiment, a voltage reference generator has Circuit comprising first chopped operational amplifier OP1 and output terminal of the OP1 is coupled with gate terminal of MOS M1 transistor and drain terminal of the said MOS M1 is coupled to first terminal resistance R1*b* and second terminal of said first resistance is further coupled to first terminal of second resistance and third resistance and current output terminal of current DAC, second terminal of said second resistance and third resistance is coupled to first terminal of fourth variable resistance and fifth variable resistance and sixth variable resistance and input terminals of the said first chopped OP1, Said sixth resistance is coupled to first bipolar transistor and second bipolar transistor is coupled to second terminal of second resistance and a third bipolar transistor emitter is coupled to second terminal of said fourth resistance and fifth resistance, Said third bipolar transistor is coupled to second MOS transistor, Gate terminals of second, third and fourth MOS transistors are coupled to second chopped amplifier OP2 output terminal and positive terminal of said OP2 is coupled to drain terminal of said fourth MOS transistor and first terminal of seventh Resistance with positive temperature coefficient and second terminal of said seventh resistance is coupled to first terminal of eighth resistance and drain terminal of said third MOS transistor is coupled to current reference input terminal of the said current DAC. And current DAC output terminal is coupled to first resistance.

This invention also provides a method for calibrating a Voltage Reference comprising a first sensing transistor and second sensing transistor and third sensing transistor biased with temperature independent current and on chip heating element configured to generate high resolution temperature steps, the method comprising:

(a) performing the first voltage calibration while heater is off or at lowest modulation index of using control 1 by changing the said current mode DAC inputs to a value where reference voltage is at desired value at one temperature point, (b) Performing the second voltage calibration by activating heater with control 3 input to heater then monitoring the change in reference voltage by changing the modulation index of control 3 input then minimising this change by changing the first variable resistor with control 2 and repeat the process until there is change in output voltage more than acceptable accuracy with change in heater control input, (c) Performing the third voltage calibration by activating heater with control 3 input to heater then monitoring the change in reference voltage by changing the modulation index of control 3 input then minimising this change by changing the second variable resistor with control 4 and repeat the process until there is change in output voltage more than acceptable accuracy with change in heater control input.

The modulation index is defined by the ration of high time of control input to sum of high time and low time period of control input where high time indicated the duration where heater is on and low time indicates where heater is of and further sum of high time and low time is the total modulation interval.

The acceptable accuracy is the ratio of variation in reference voltage of the device with temperature and nominal value of the reference voltage expressed in percentage.

The control signals 1,2,4 being structured so that modulation index values achieved during calibration process are stored in memory to be used in future when device is in normal use for reference voltage vs temperature curve compensation.

DETAILED DESCRIPTION OF INVENTION

Figure 1:
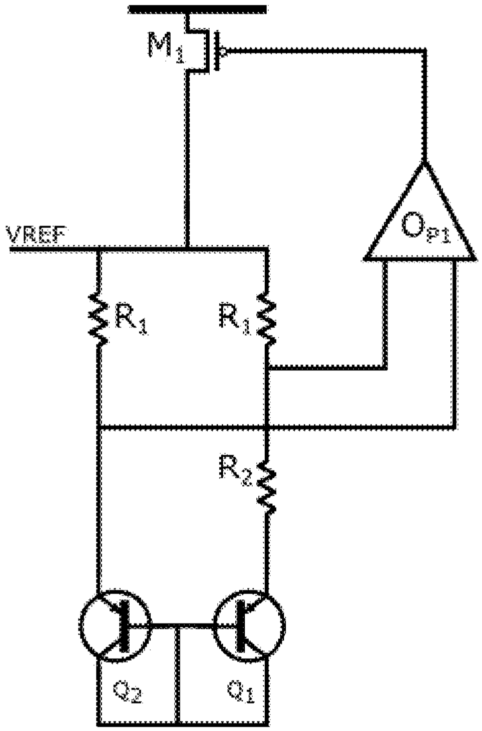
FIG. 1 (Prior Art)
FIG. 1: Prior Art

Voltage reference generation prior art shown in FIG. 1 has output reference voltage $V_{REF}$ is generated by defined by following equation $$V_{REF} = V_{BE2} + \Delta V_{BE} * \alpha \tag{1}$$

$$V_{REF} = V_{BE2} + V_T * \ln(N) * \frac{R1}{R2} \tag{2}$$

In equation 1 and 2 $V_{BE2}$ is base to emitter voltage difference of the Bipolar Junction Transistor (BJT) Q2 and $\Delta V_{BE}$ is the difference $V_{BE}$ of the transistor Q1 and Q2, VT is a constant proportional to temperature and N is the base area ratio of Q1 and Q2.

As it clear from the equation 2 that if all other variables are like operational amplifier (opamp) offset and resistance mismatch is ignored then $V_{REF}$ temperature dependence is defined by the $V_{BE}$ voltage of the BJT. It is well known that $V_{BE}$ of the BJT is defined by saturation current (Is) and collector current (Ic) by following equation.

$$V_{BE} = V_T \ln\left(\frac{I_C}{I_S + \Delta I_S}\right) \tag{3}$$

Figure 3:
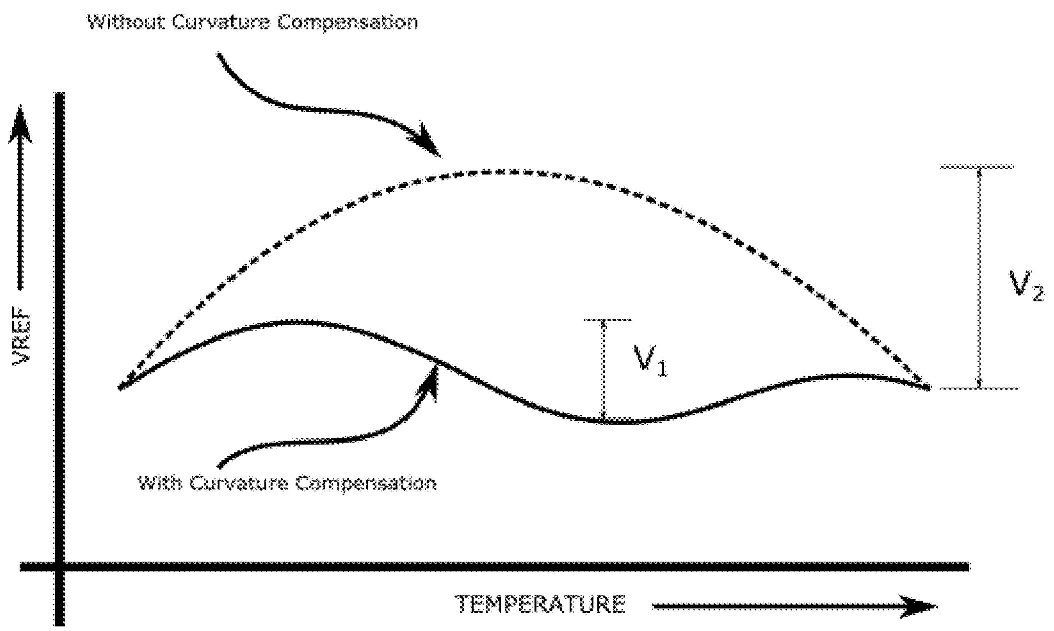
FIG. 3: Curvature compensation impact and precision improvement
Figure 4:
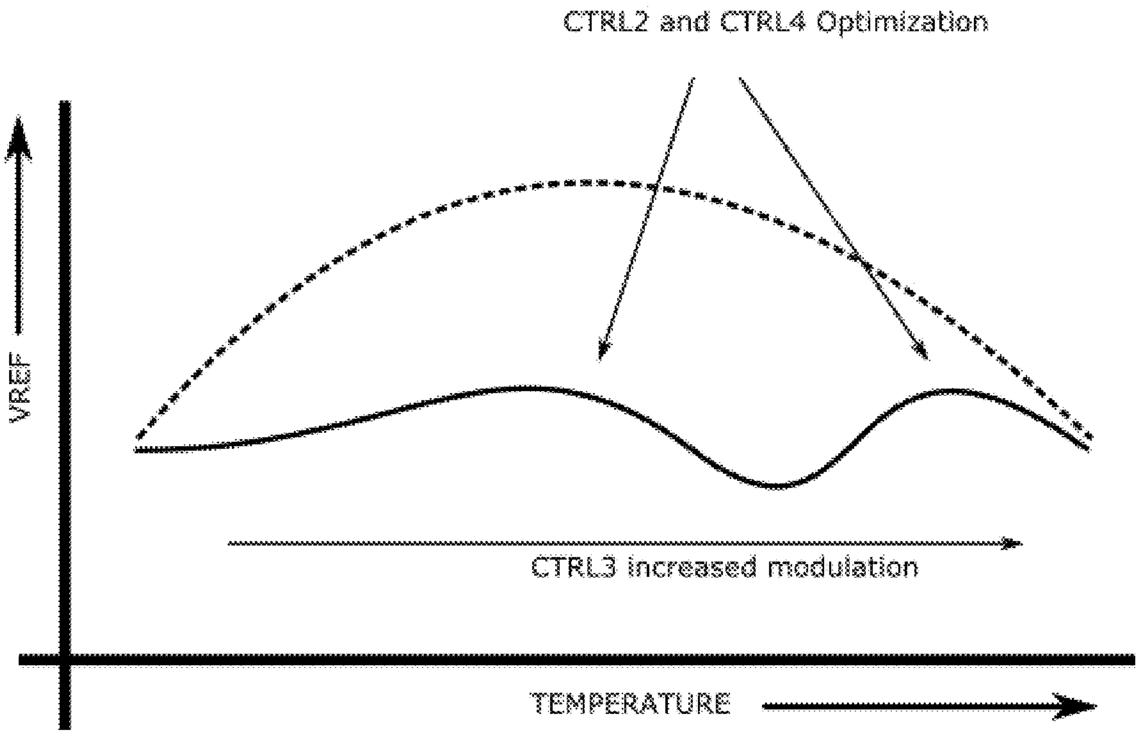
FIG. 4: Trimming Controls impact on transfer curve

It can be proven that any change in Ic and Is is actually proportional to temperature and it can be cancelled by adjusting the resistance R2. In CMOS process current gain beta is highly process dependent and it has non-linear temperature impact on $V_{BE}$ and this needs curvature compensation to improve the accuracy of the generated reference voltage. Another component is the base resistance of the BJT which is also one of the contributors to the accuracy of the $V_{BE}$ with temperature. The impact of the current gain beta and base resistance is required to be compensated using curvature compensation. This kind of curvature compensation needs voltage information at multiple temperature points and discrete temperature points might miss the actual peaks of the change in $V_{REF}$ as shown in FIG. 3.

Figure 2:
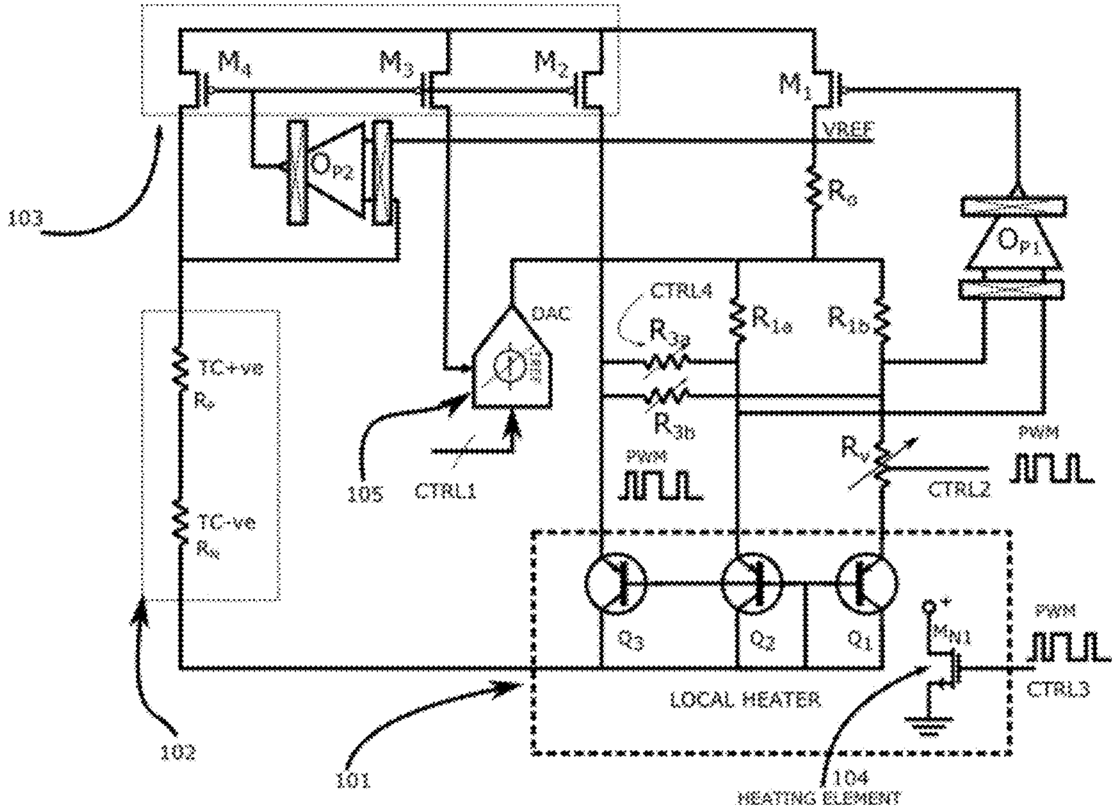
FIG. 2: Present Invention with curvature compensation

The present invention is described with the help FIG. 2 wherein Voltage reference Generator comprises Local heater (101) which consists a ohmic heating element (104) made from MOS transistor MN1, where MOS transistor MN1 is generating heat by thermal effect from ohmic loss of current flowing through the drain to source terminals of MOS MN1, temperature compensated resistances (102) consisting two or more resistances of positive (RP) and negative (RN) temperature coefficients with their values pre-determined in a way that total temperature coefficient of combined resistance is lower than their individual temperature coefficients, current mirrors (103) consisting of plurality of MOS transistors M2,M3,M4, where in current flowing in M4 is generated by $V_{REF}$/(RP+RN) using operational amplifier Op2 and further mirrored to MOS M2 and M3, current mirrored in MOS M3 is reference current IREF for current DAC (105) which is further used to generate current output i.e. proportional to IREF using control signal CTRL1 and further current mirrored through MOS M2 is used to bias BJT Q3 which has its emitter coupled to drain of MOS M2 and emitter of BJT Q3 is further coupled to first terminal of variable resistance R3*a* and R3*b*, R3*a* and R3*b* resistance can be simultaneously changed by signal CTRL4, The second terminal of resistance R3*a* is coupled to emitter terminal of BJT Q2 and first terminal of resistance R1*a*, further the second terminal of resistance R3*b* is coupled to first terminal of variable resistance RV controlled by CTRL2 and first terminal of resistance Rib, further the second terminal of variable resistance Rv is coupled to emitter of BJT Q1 and further the second terminals of resistances R1*a*, R1*b* are coupled to further output of said DAC (105) and first terminal of resistance Ro, second terminal of resistance Ro is coupled to drain terminal of MOS M1 generating reference voltage output $V_{REF}$, gate terminal of MOS M1 is coupled to output terminal of operational amplifier OP1, differential input terminals of operational amplifier OP1 are coupled to first terminals of resistance R1*a*,R1*b*, signals CTRL1 CTRL2, CTRL3, CTRL4 can be digital bits which are pulse width modulated (PWM) or pulse density modulated (PDM) in order to control the temperature generated from the local heater (101) in order to achieve continuous temperature control. By application of pulse modulation to the heating elements the total heat generated proportional to the modulation index D defined by high time Tx and Low time TL of the control signals $$D = \frac{T_H}{T_L + T_H} \tag{4}$$

Figure 5:
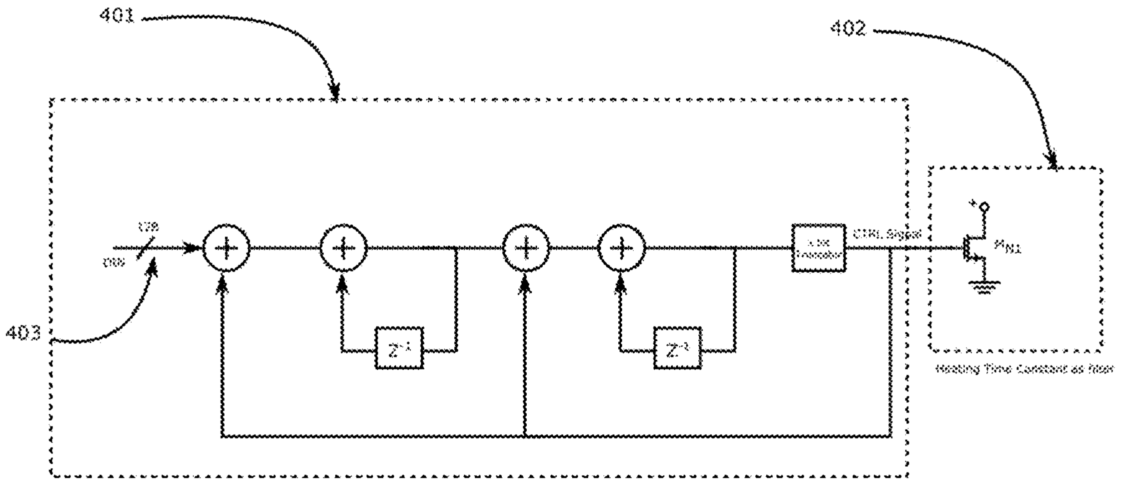
FIG. 5: Digital Modulator and Heating Time Constant as Filter

As shown in FIG. 5 the example structure of a digital modulator 401 is shown where input 403 is a digital number of 12 bits which can change from 0-4095 and generate 4096 different scenarios of modulation index D to control the heating element 402, similar arrangement is applicable for all other control signals.

Present invention is able use the trimming control CTRL1, CTRL2 and CTRL4 to achieve acceptable change in $V_{REF}$ when on-chip heater is used to change the die temperature using CTRL3 signal and MN1. For example, the $V_{REF}$ voltage is measured and change in $V_{REF}$ is served and CTRL2 and CTRL4 are changed in the direction so that change in $V_{REF}$ is minimum when heater control modulation factor changed from lowest value to highest value. Same process is repeated at increased value of the CTRL3 using input 403. For those skilled in the art, it is true that there could be multiple optimization schemes possible for the control of CTRL1, CTRL2 and CTRL4 and present invention is not limited to use of any of these like Multi-Layer (ML) least mean square (LMS) algorithm, etc. CTRL1, CTRL2 and CTRL4 are controlled by Pulse Width Modulators (PWM) and/or Pulse Density Modulators (PDM) signals be generated by modulators such as delta sigma modulators. The modulation index of the modulator controls the density of the PWM/PDM signals and hence the heater average power which is resulting in temperature increase.

The calibration is conducted by:

(a) performing the first voltage calibration while heater is off or at lowest modulation index of using control 1 by changing the said current mode DAC inputs to a value where reference voltage is at desired value at one temperature point, (b) Performing the second voltage calibration by activating heater with control 3 input to heater then monitoring the change in reference voltage by changing the modulation index of control 3 input then minimising this change by changing the first variable resistor with control 2 and repeat the process until there is change in output voltage more than acceptable accuracy with change in heater control input, (c) Performing the third voltage calibration by activating heater with control 3 input to heater then monitoring the change in reference voltage by changing the modulation index of control 3 input then minimising this change by changing the second variable resistor with control 4 and repeat the process until there is change in output voltage more than acceptable accuracy with change in heater control input.

Performing the second voltage calibration by activating heater with highest modulation index with control input to heater and changing the first variable resistor to minimise the proportional change in voltage with heater control modulation index then increasing the control input to the heater and changing the first variable resistor to further minimise the change in $V_{REF}$ voltage with change in temperature Present invention as shown in FIG. 2 where Opamp OP1 is chopped for its intrinsic offset and output of the Opamp OP1 is coupled with gate terminal of PMOS M1 and drain terminal of PMOS M1 is coupled first terminal of R0 and second terminal of R0 is further coupled to first terminal of resistance R1*a*, R1*b* and current DAC [105] output, second terminal of R1*a* and R1*b* is coupled to first terminal of R3*a*, R3*b*, Rv and Op1 input terminals. BJT Q1 is coupled to second terminal of Rv and Q2 is coupled to second terminal of R1*a* and Q3 emitter is coupled to second terminal of R3*a*, R3*b*. BJT Q3 is coupled to PMOS M2. Gate terminals of PMOS M2, M3, M4 are coupled to chopped Opamp OP2 output and positive terminal of OP2 is coupled to Drain Terminal of PMOS M4 and Resistance Rp with positive temperature coefficient and second terminal of resistance $R_P$ is coupled to $R_N$. Drain terminal of M3 is coupled to current reference input terminal of the current DAC [105].

Present invention is using a constant temperature compensated current generated using OP2, PMOS M4 and resistors RP, RN. This compensated current is mirrored using PMOS M2 and biasing the transistor Q3. Emitter of transistor Q3 is further coupled to input terminals of OPAMP OP1.

$$V_{REF} = V_{BE0} - (V_{BE0} - V_{BE2(T0)}) * \frac{T}{T0} - (\gamma - 1) * V_T * \ln(N) * \frac{R1 + 2R0}{Rv} * \frac{R3}{R1 + 2R0} \tag{3}$$

Where $\gamma$ is a process dependent constant and $V_{BE0}$ is $V_{BE}$ at absolute temperature. If R3 is trimmed in such a way that $$\frac{R3}{R1 + 2R0}$$

is able to cancel the component (γ−1) and in component $$\frac{R1+2R0}{Rv},$$

resistance Rv adjusted in such a way that $$(V_{BE0}-V_{BE2(T0)})*\frac{T}{T0}$$

is cancelled then $V_{REF}$ is independent of the temperature and it is equal to $V_{BE0}$ which is bandgap voltage of silicon and best precision is achieved.

Present invention has application of 4 control signals to perform the trimming of the proposed circuit and achieve desired precision of the generated voltage.

Figure 6:
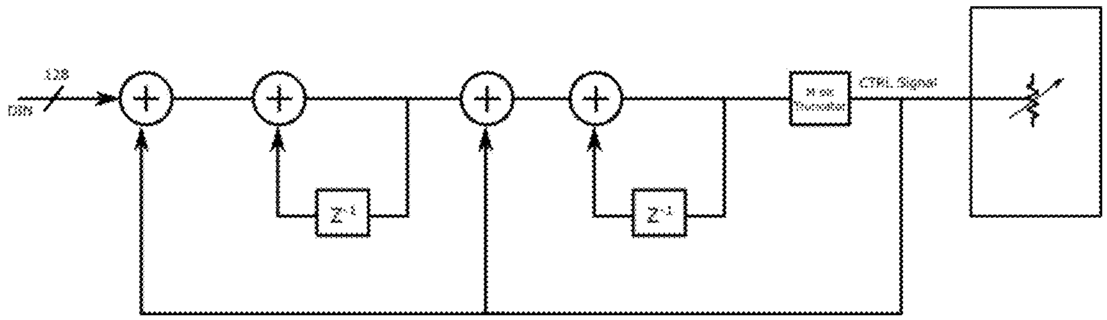
FIG. 6: Resistance Trimming Implementation

As shown in FIG. 2 the signals named CTRL1, CTRL2, CTRL3 and CTRL 4 are generated using pulse density modulation as shown in FIG. 5 and FIG. 6. Where examples at FIG. 5 and FIG. 6 using second order delta sigma modulators for illustration purpose but they are not limited to it and someone skilled in the art can apply any other modulator architecture to improve the precision of the trimming circuit.

Figure 7:
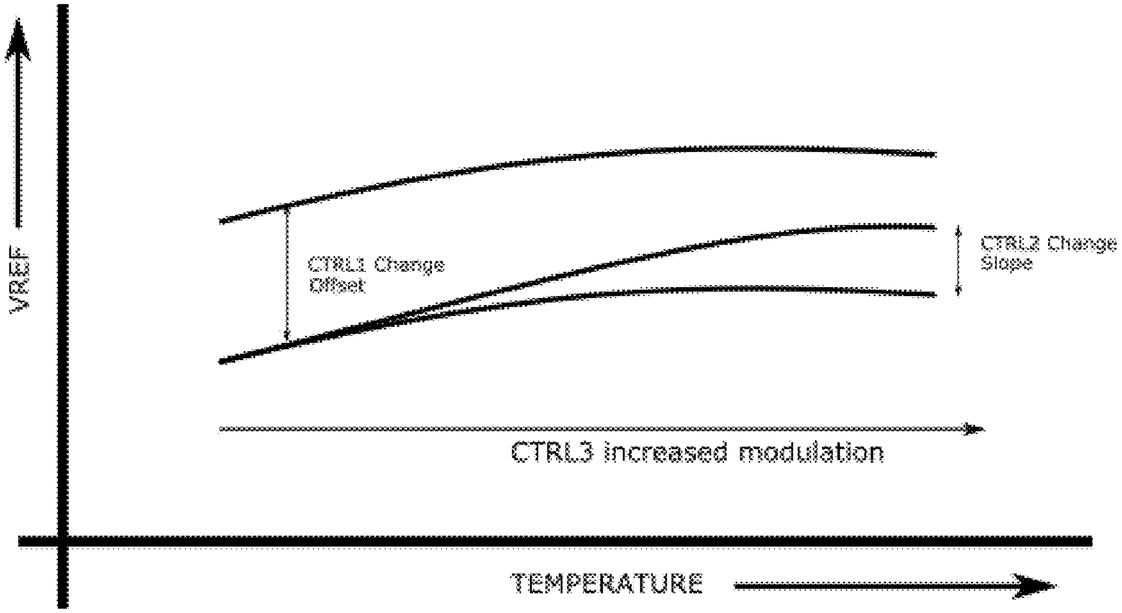
FIG. 7: Changing voltage using different signals

As shown in FIG. 7 the signal CTRL1 is used to change the $V_{REF}$ voltage independent of temperature using the current DAC 105 and CTRL2 is used change the slope of the output voltage $V_{REF}$ using the trimming of Rv, with temperature. Signal CTRL4 is used to cancel the (γ−1) component of the equation 3.

DAC 105 is a current mode DAC where reference current is temperature compensated current derived from $$\frac{VREF}{RP+RN}$$

and based on digital codes it is changing the $V_{REF}$ voltage by $R_0*I_{DAC}$ where $I_{DAC}$ is the current at output of the DAC 105.

Control signal CTRL3 is the output of the digital delta sigma modulator 401 and it may have lower resolution as compared to input signal DIN 403. As thermal time constant can be much higher as compared to modulator clock period the complete arrangement is an electro thermal filter with much higher precision for the control of the temperature. Signal DIN 403 and temperature generated by the heater are proportional in nature but not linear. Present invention enables precise temperature control by changing the modulation index of the PWM/PDM signals generated from the delta sigma modulators, as compared to prior arts [1-8] hence enables to find each temperature point with maxima and minima to trim the resistances for better accuracy.

Present invention also enables the independent control of the output $V_{REF}$ for slope and offset as shown in FIG. 7 using CTRL1 and CTRL2 control signals and also enables curvature compensation using trimming of the resistance R3*a*, R3*b* using control signal CTRL4.

Control signals CTRL2 and CTRL4 are inputs of resistive DAC implemented in Rv and R3*a*, R3*b* by switching the resistances on and off in digital proportion hence producing a variable resistance.

The method for calibrating the Voltage Reference Circuit comprising a first sensing transistor Q1 and second sensing transistor Q2 and third sensing transistor Q3 biased with temperature independent current generated by M2 and on chip heating element MN1 configured to generate high resolution temperature steps with modulated third input CTRL3. First variable resistor Rv coupled to first sensing transistor Q1 and second pair of variable resistors R3*a*, R3*b* coupled to second sensing transistor Q2 and third pair of resistors R1*a*, R1*b* coupled to said second pair of resistors R3*a*, R3*b* and current mode digital to analog converter 105 with temperature independent reference current 103. The calibration method is performed by doing the first voltage calibration while heater is off by changing the said current mode digital to analog converter 105 input CTRL1 to adjust the output voltage at desired level then performing the second voltage calibration by activating heater 104 on with first control input CTRL3 to heater and changing the first variable resistor Rv to minimise the proportional change in voltage with heater at first modulation index value then increasing the modulation index to the second value of the heater 104 and changing the first variable resistor Rv to further minimise the proportional change in voltage $V_{REF}$ and repeat the process until there is change in output voltage more than first tolerance with increase in heater control input. Then performing the third voltage calibration by starting the heater 104 with third modulation index and minimise the overall change in voltage by changing the second pair of resistors R3*a*, R3*b* control CTRL4 and repeat the process until change in voltage is lower than second tolerance.

I claim:

1. A Voltage reference Generator comprising:

a local heater structured to generate continuous controlled temperature and uniform thermal profile, at multiple points further comprising Bipolar Junction Transistors, and a heating element;

temperature compensated resistances adopted to generate constant temperature compensated voltage reference current using an operational amplifier, a PMOS transistor, and two or more resistors, positive and negative;

current mirrors comprising a plurality of MOS transistors configured to mirror current flowing in the PMOS transistor;

digital modulators structured to generate modulated control signals;

one or more control signals including modulated digital bits being structured to control the temperature generated from the local heater in conjunction with variable resistances, by trimming change in the voltage reference; and a Digital to Analog Converter (DAC) configured to generate output current proportional to a current reference mirrored in one or more of the plurality of MOS transistors.

2. A voltage reference generator of claim 1, wherein one or more of the plurality of MOS transistors is generating heat by thermal effect from ohmic loss of current flowing through drain to source terminals of the one or more of the plurality of MOS transistors.

3. A voltage reference generator of claim 1, wherein digital modulators include one or more of a pulse width modulator and a pulse density modulator.

4. A voltage reference generator of claim 1, further comprising:

a Circuit comprising:

a first chopped operational amplifier and output terminal of the first chopped operational amplifier is coupled with gate terminal of a first transistor of the plurality of MOS transistors and drain terminal of the first transistor of the plurality of MOS transistors is coupled to first terminal resistance and second terminal of said first resistance is further coupled to first terminal of second resistance and third resistance and current output terminal of current DAC, a second terminal of said second resistance and third resistance is coupled to first terminal of fourth variable resistance and fifth variable resistance and sixth variable resistance and input terminals of the said first chopped operational amplifier, said sixth resistance is coupled to first bipolar transistor and second bipolar transistor is coupled to second terminal of second resistance and a third bipolar transistor emitter is coupled to second terminal of said fourth resistance and fifth resistance, said third bipolar transistor is coupled to a second transistor of the plurality of MOS transistors, gate terminals of the second, a third, and a fourth transistor of the plurality of MOS transistors are coupled to the operational amplifier output terminal and positive terminal of said operational amplifier is coupled to drain terminal of said fourth transistor and first terminal of a seventh resistance with positive temperature coefficient and second terminal of said seventh resistance is coupled to first terminal of eighth resistance; and a drain terminal of said third transistor is coupled to current reference input terminal of the said current DAC the current DAC output terminal is coupled to first resistance.

5. A method for calibrating a Voltage Reference Circuit of claim 4 comprising a first sensing transistor and second sensing transistor and third sensing transistor biased with temperature independent current and on chip heating element configured to generate high resolution temperature steps, the method comprising:

performing a first voltage calibration while heater is off or at lowest modulation index of using control 1 by changing one or more current mode DAC inputs to a value where reference voltage is at desired value at one temperature point;

performing a second voltage calibration by activating heater with control 3 input to heater then monitoring the change in reference voltage by changing the modulation index of control 3 input then decreasing this change by changing a first variable resistor with control 2 and repeat the second voltage calibration until there is change in output voltage more than acceptable accuracy with change in heater control input; and performing a third voltage calibration by activating heater with control 3 input to heater then monitoring the change in reference voltage by changing the modulation index of control 3 input then decreasing this change by changing a second variable resistor with control 4 and repeat the third voltage calibration until there is change in output voltage more than acceptable accuracy with change in heater control input.

6. The method of claim 5, wherein the modulation index is defined by a ration of high time of control input to sum of high time and low time period of control input where high time indicated a duration where heater is on and low time indicates where heater is off and further sum of high time and low time is a total modulation interval.

7. The method of claim 5, wherein the acceptable accuracy is a ratio of variation in reference voltage of a device with temperature and nominal value of the reference voltage expressed in percentage.

8. The method of claim 5, wherein the control signals being structured so that the modulation index values achieved during calibration process are stored in memory to be used in future when device is in normal use for reference voltage vs temperature curve compensation.

* * * * *